(12) United States Patent
Doraiswamy et al.

(10) Patent No.: US 10,858,991 B2
(45) Date of Patent: Dec. 8, 2020

(54) RECIPROCATING-PISTON MACHINE

(71) Applicant: AVL LIST GMBH, Graz (AT)

(72) Inventors: Devaraj Doraiswamy, Graz (AT); Andreas Krobath, St. Josef in der Weststeiermark (AT); Bernhard Hausmann, Kaindorf (AT); Jürgen Gelter, Graz (AT); Andreas Zurk, Weinburg (AT)

(73) Assignee: AVL LIST GMBH, Graz (AT)

( * ) Notice: Subject to any disclaimer, the term of this patent is extended or adjusted under 35 U.S.C. 154(b) by 19 days.

(21) Appl. No.: 16/306,320

(22) PCT Filed: May 31, 2017

(86) PCT No.: PCT/AT2017/060141
§ 371 (c)(1),
(2) Date: Nov. 30, 2018

(87) PCT Pub. No.: WO2017/205886
PCT Pub. Date: Dec. 7, 2017

(65) Prior Publication Data
US 2019/0120135 A1 Apr. 25, 2019

(30) Foreign Application Priority Data
May 31, 2016 (AT) .............. A 50490/2016

(51) Int. Cl.
*F02B 75/04* (2006.01)
*F16C 7/06* (2006.01)
*F02B 23/02* (2006.01)

(52) U.S. Cl.
CPC ............ *F02B 75/045* (2013.01); *F02B 23/02* (2013.01); *F16C 7/06* (2013.01)

(58) Field of Classification Search
CPC .................. F02B 75/045; F16C 7/06
(Continued)

(56) References Cited

U.S. PATENT DOCUMENTS 2,989,954 A 6/1961 Hulbert
4,124,002 A * 11/1978 Crise .............. F02B 75/045
123/78 E (Continued)

FOREIGN PATENT DOCUMENTS

DE 102014216531 A1 * 2/2016 ............. F02D 15/02
EP 3059412 B1 8/2016
(Continued)

Primary Examiner — George C Jin
Assistant Examiner — Teuta B Holbrook
(74) Attorney, Agent, or Firm — Dykema Gossett PLLC

(57) ABSTRACT

The invention relates to a reciprocating-piston engine, in particular an internal combustion engine having a variable compression ratio with a length adjusting device which is arranged in a connecting rod and which can be activated by a switching unit arranged in the connecting rod, wherein an actuating mechanism is operatively connected to the switching unit in the region of a connecting rod bearing in order to introduce a switching pulse into the connecting rod. The actuating mechanism has a deflection element with at least one first force-application region and at least one second force-application region, and the first force-application region and the second force-application region can be selectively contacted with at least one actuating device.

18 Claims, 8 Drawing Sheets

(58) Field of Classification Search
USPC .................................. 123/78 E, 48 B, 197.3
See application file for complete search history.

(56) References Cited

U.S. PATENT DOCUMENTS

| | | | | |
|---|---|---|---|---|
| 4,738,230 | A * | 4/1988 | Johnson | F02F 7/0019 |
| | | | | 123/48 B |
| 5,146,879 | A * | 9/1992 | Kume | F01M 1/06 |
| | | | | 123/48 B |
| 5,960,750 | A * | 10/1999 | Kreuter | F02B 75/045 |
| | | | | 123/48 B |
| 6,497,203 | B1 * | 12/2002 | Rao | F02B 75/045 |
| | | | | 123/48 B |
| 6,499,446 | B1 * | 12/2002 | Rao | F02B 75/045 |
| | | | | 123/48 B |
| 6,622,669 | B1 * | 9/2003 | Nageswar Rao | F02B 75/045 |
| | | | | 123/48 B |
| 8,851,030 | B2 * | 10/2014 | von Mayenburg | F16C 23/10 |
| | | | | 123/48 B |
| 2004/0261733 | A1 * | 12/2004 | Henig | F02B 75/045 |
| | | | | 123/78 E |
| 2007/0175422 | A1 | 8/2007 | Takahashi et al. | |
| 2013/0247879 | A1 * | 9/2013 | von Mayenburg | F16C 23/10 |
| | | | | 123/48 B |
| 2015/0122077 | A1 * | 5/2015 | Melde-Tuczai | F02B 75/045 |
| | | | | 74/586 |
| 2015/0152794 | A1 | 6/2015 | Paul | |
| 2016/0237889 | A1 * | 8/2016 | Melde-Tuczai | F02B 75/045 |
| 2017/0268422 | A1 * | 9/2017 | Popp | F02B 75/048 |
| 2018/0266313 | A1 * | 9/2018 | Melde-Tuczai | F16K 11/056 |
| 2018/0347645 | A1 * | 12/2018 | Cornelius | F16D 41/20 |

FOREIGN PATENT DOCUMENTS

| | | |
|---|---|---|
| WO | 2016026487 A1 | 2/2017 |
| WO | 2016026488 A1 | 2/2017 |

* cited by examiner

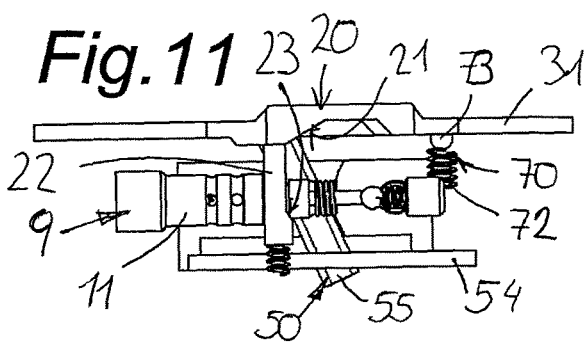
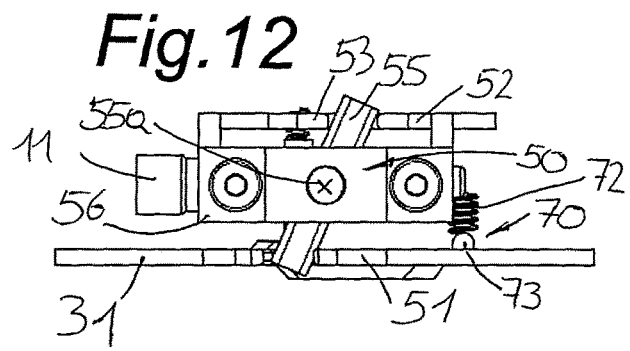
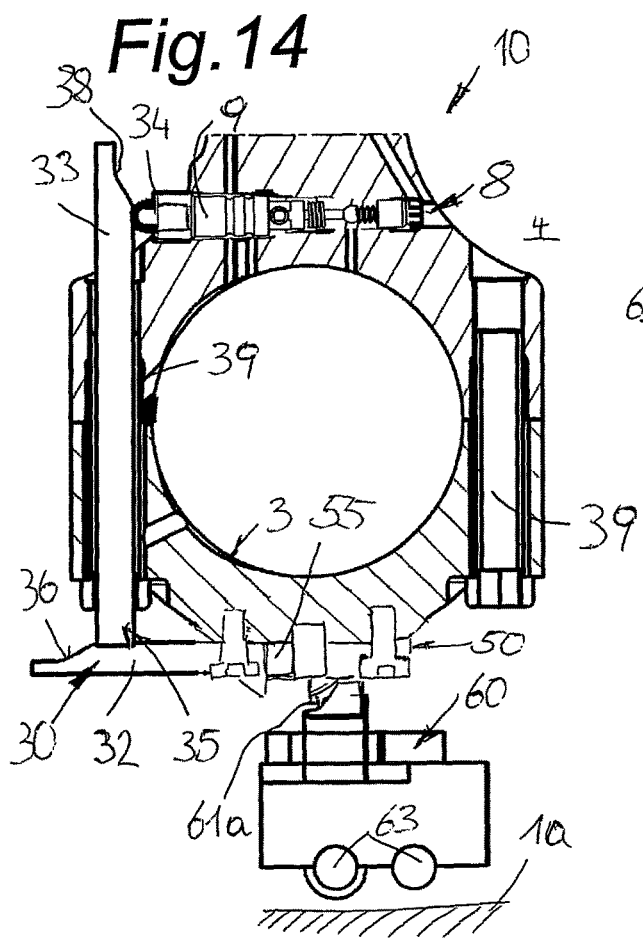
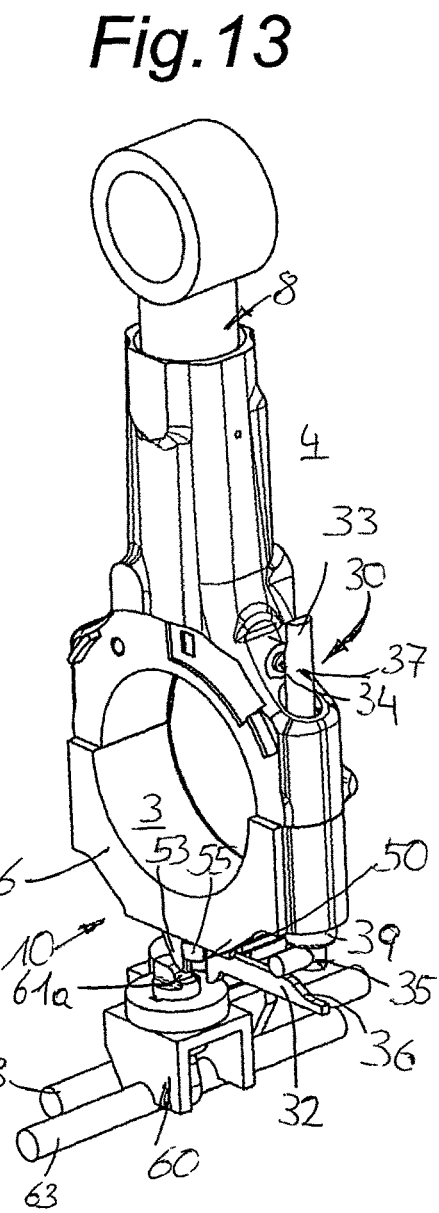

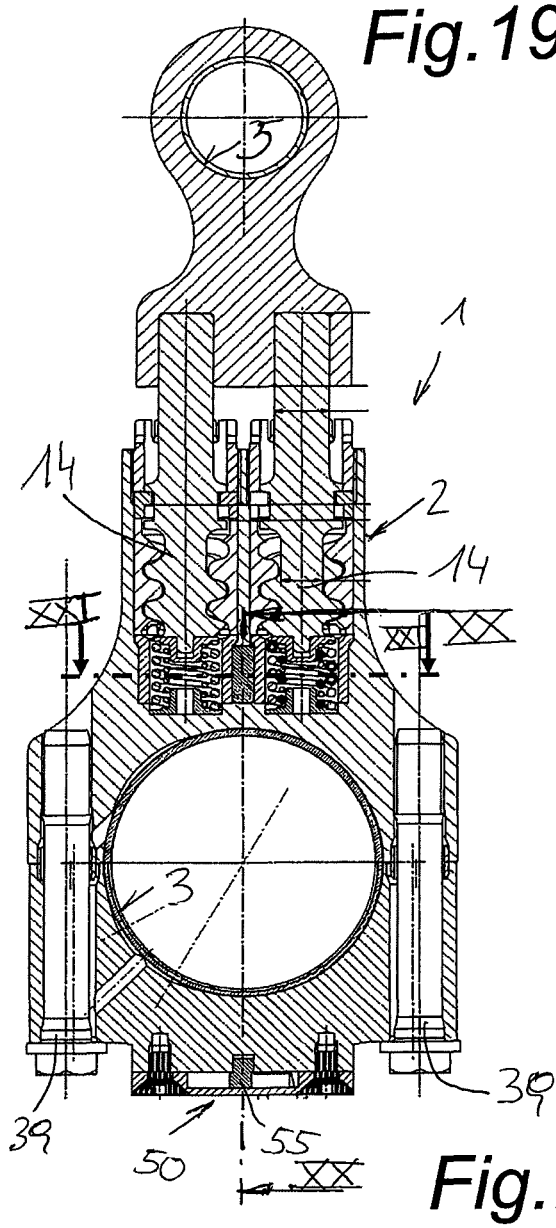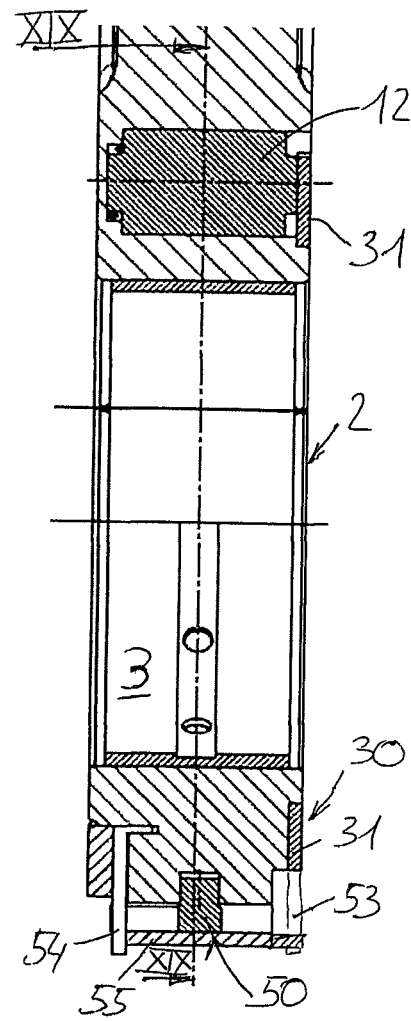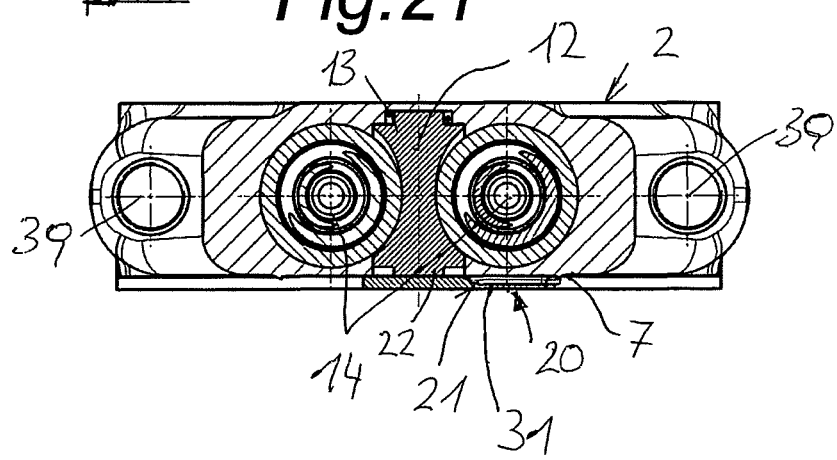

RECIPROCATING-PISTON MACHINE

CROSS-REFERENCE TO RELATED APPLICATIONS

This application is a national stage filing based upon International PCT Application No. PCT/AT2017/060141, filed 31 May 2017, which claims the benefit of priority to Austria application No. A 50490/2016, filed 31 May 2016.

BACKGROUND

The invention relates to a reciprocating-piston engine—in particular an internal combustion engine—having a variable compression ratio with a length adjusting device which is arranged in a connecting rod and which can be activated by a switching unit arranged in the connecting rod, wherein an actuating mechanism is operatively connected to the switching unit in the region of a connecting rod bearing in order to introduce a switching pulse into the connecting rod.

Internal combustion engines with variable compression ratios are used, for example, to increase the efficiency of internal-combustion engines in operating ranges which deviate from the optimum.

Reciprocating-piston engines usually have a connecting rod that can be pivoted in a connecting rod bearing around a crankpin of the crankshaft. A piston pin bearing is provided at the end of the connecting rod remote from the connecting rod bearing. The connecting rod is pivotably connected to a piston via a piston pin arranged in the piston pin bearing. The piston moves back and forth in a cylinder between its top dead center and its bottom dead center.

Length adjusting devices can be designed mechanically, for example via threaded spindles and spindle nuts, or also hydraulically, via hydraulic chambers in the connecting rod, which can be filled with hydraulic medium via hydraulic lines from the connecting rod bearing.

A switching unit is any device which can switch the length adjusting device from holding its position to extending or shortening the connecting rod.

The switching pulse here is the pulse coming from outside the connecting rod to switch the length adjusting device.

An actuating mechanism is required to move the switching unit to the desired position.

An operative connection is understood here as a connection for the transmission of forces and displacements.

From DE 10 2013 113 432 A1, a switching valve unit is known which has an actuation module with a linearly displaceable pick-up element for actuation from the outside onto the connecting rod. In this case, the actuation module is arranged in the connecting rod in the area of the connecting rod bearing in the direction of the piston pin bearing. The pick-up element in the embodiments shown can be moved parallel to one plane. This plane is defined by the rotational axes of the piston pin bearing and the connecting rod bearing. By shifting the pick-up element, hydraulic paths are released and blocked by two valves which are shifted due to ramps of the pick-up element.

It is not exactly revealed how the displacement of the pick-up element occurs. In the area in which it is arranged the introduction of a switching pulse is difficult. An actuating mechanism is missing which actuates the pick-up element from an easily accessible position.

It is the object of the present invention to avoid these disadvantages and to specify a reciprocating-piston engine with a robust and simple actuating mechanism for introducing a switching pulse.

SUMMARY OF THE INVENTION

This object is achieved according to the invention in that the actuating mechanism has a deflection element with at least one first force-application region and at least one second force-application region, and that the first force-application region and the second force-application region can be selectively contacted with at least one actuating device. This deflection element makes it possible to adjust the actuating mechanism only by the pivoting movement of the connecting rod.

Due to the deflection element no complicated actuating device is necessary, but a switching pulse can be introduced into the length adjusting device with the actuating device only by the own movement of the connecting rod from the outside.

The deflection element is particularly easy to implement if it has a deflection lever.

Easy accessibility or reachability of the deflection element is achieved when the deflection element is arranged on a connecting rod bearing bracket and can preferably be contacted with the actuating device near a lower dead center of the connecting rod. The same advantage results when the actuating device is located in a crankcase. The actuating device can also be located in the oil pan or on the base plate.

Here, the connecting rod has a connecting rod bearing bracket facing away from the piston and a connecting rod body facing the piston around the connecting rod bearing.

It is advantageous if the actuating mechanism has transmission means which is operatively connected to the deflection element and which is arranged in the region of the connecting rod bearing. The transmission means is used here to transmit forces and displacements from the deflection element to the switching unit. This gives rise to the advantage that the distance between the switching unit and the deflection element can be overcome and that the switching unit and the deflection element do not necessarily have to be arranged next to each other.

In order to obtain an embodiment which is as simple as possible, it is advantageous if the transmission means, on a side of the connecting rod remote from the connecting rod bearing bracket, has a pick-up unit for actuating the switching unit for the length adjusting device and the pick-up unit has a ramp and a thrust element displaceable through the ramp, or if the pick-up unit has an elongated hole in which a pin is arranged displaceably normal to its longitudinal axis, i.e. a pin axis.

It is advantageous if the deflection element has at least one first driver which is connected to the transmission means and which is preferably fork-shaped when the first driver is in engagement with the deflection lever, and if the deflection element has at least one second driver which is preferably fork-shaped. The fork shape is designed in order to be able to grip the deflection lever from two sides as far as possible. Therefore the deflection lever is arranged between the fork arms and both fork arms act on the deflection lever. In this way a displacement in both directions can be transferred from the driver to the deflection lever and vice versa. The second driver is engaged with the deflection lever on the side of the deflection element facing away from the first driver.

A particularly simple embodiment with few individual parts is obtained if the transmission means is designed as a ring slide and the ring slide serves to transmit the switching pulse from the connecting rod bearing bracket to the connecting rod body. The ring slide is a ring-shaped disc that rotates around the connecting rod bearing and can be moved by the deflection element.

The ring slide is advantageously divided in this case for assembly. It is advantageous if the ring slide is divided by the pitch plane of the connecting rod bearing.

Alternatively, the transmission means may comprise at least a first push rod, a second push rod and a third push rod, with the first push rod being operatively connected to the second push rod and the second push rod being operatively connected to the third push rod. In this case, the motion transmission is particularly simple kinematically, since no rotary motion is necessary.

The same advantage arises when the transmission means has at least a first push rod, a tilt rod and a third push rod, and the first push rod is operatively connected to the tilt rod and the latter is operatively connected to the third push rod.

In order to switch a hydraulically operable length adjusting device as simply as possible, it is advantageous if the switching unit is designed as a switching valve.

For locking or releasing mechanical length adjusting devices, it is advantageous if the switching unit is designed as a displaceable wedge element.

The wedge element is used, for example, to mechanically block the rotation of threaded spindles that extend or shorten the connecting rod.

Several securing elements, such as grooves, can be applied to the connecting rod and connecting rod bearing bracket to secure the ring slide.

In order to obtain an embodiment having a rapidly deployable actuation of the first force-application region and the second force-application region, it is advantageous if the actuating means comprises a first actuating element and a second actuating element, wherein the first force-application region is selectively contactable with the first actuating element and the second force-application region is selectively contactable with the second actuating element. This means that the actuating elements can be moved independently of each other and the force-application regions can be contacted more quickly. It is particularly advantageous if the actuating elements are arranged linearly displaceable or rotatable on shafts.

In order to make the contact between the actuating elements and the force-application regions as good as possible, it is advantageous if the first actuating element and the second actuating element each have a sliding surface for contacting the first force-application region and the second force-application region.

The sliding surface can preferably be arranged concave on the actuating element in order to allow gentle engagement.

To secure a position, it is advantageous if the actuating mechanism has a latching element which is arranged in such a way that a force acts on the transmission means against displacement.

A latching element is a ball with a spring and a counter surface on transmission means transversely to the displacement normal to the plane in which the transmission means is arranged.

BRIEF DESCRIPTION OF THE DRAWINGS

In the following, the invention is described in more detail using the non-restrictive figures in several embodiment examples, wherein:

FIG. 11 shows the actuating mechanism as shown in FIG. 10 in a plan view;

FIG. 12 shows the actuating mechanism analogous to FIG. 10 in a view from below;

FIG. 13 shows a connecting rod of a reciprocating-piston engine according to the invention in a second embodiment in an oblique view;

FIG. 14 shows this connecting rod in a partial section through a center plane;

FIG. 19 shows a connecting rod of a reciprocating-piston engine according to the invention in a fifth embodiment in a section according to line XIX in FIG. 20;

FIG. 20 shows this connecting rod in a section according to line XX in FIG. 19; and FIG. 21 shows this connecting rod in a section according to line XXI-XXI in FIG. 19.

DETAILED DESCRIPTION

Figure 1:
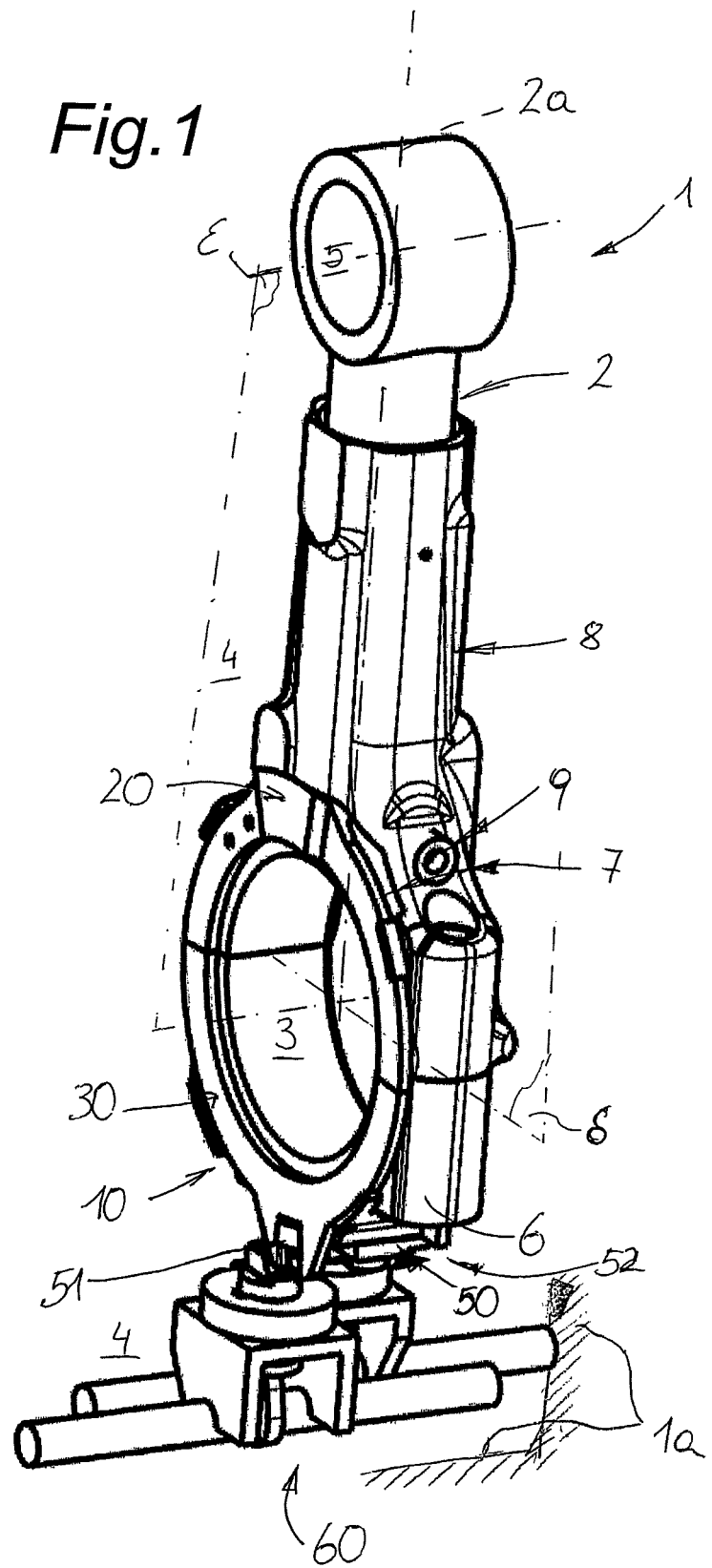
FIG. 1 shows a connecting rod of a reciprocating-piston engine according to the invention in a first embodiment in an oblique view.
Figure 2:
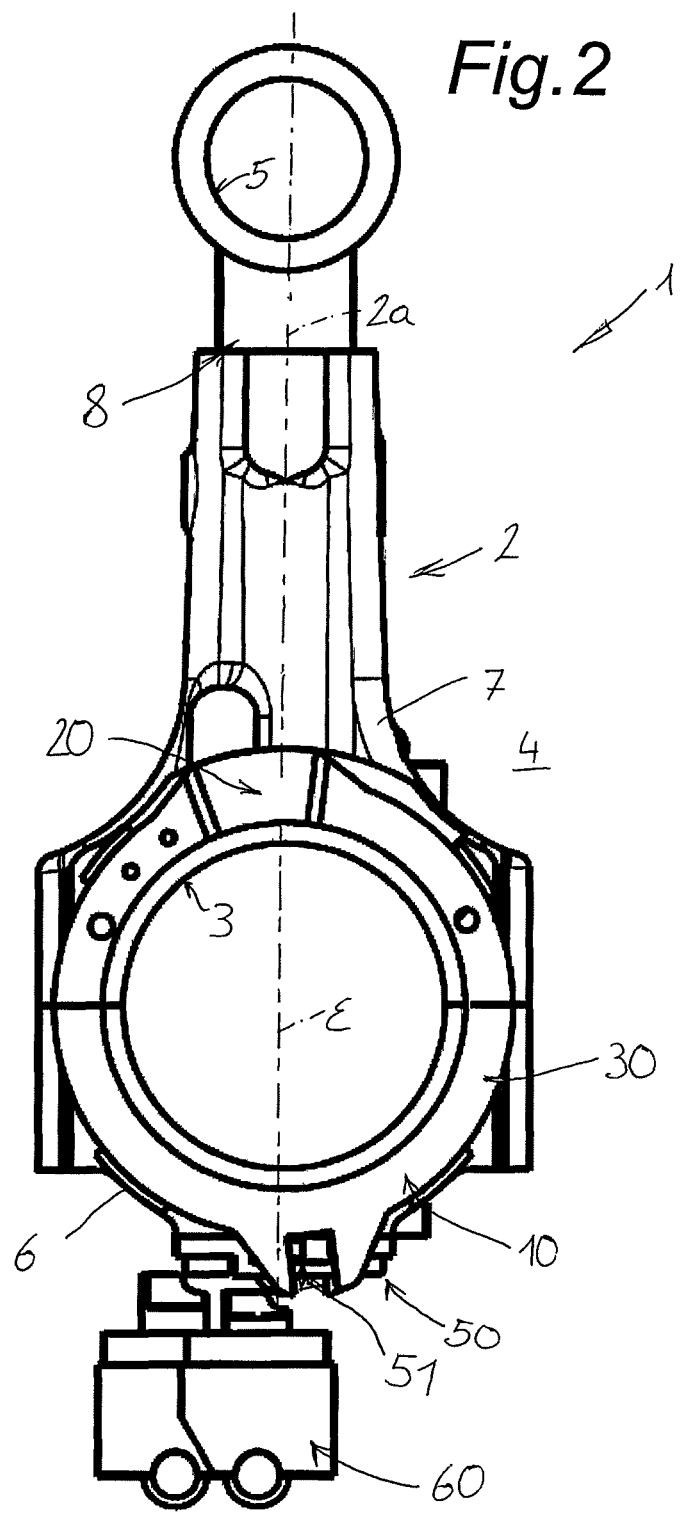
FIG. 2 shows this connecting rod in a side view.

FIG. 1 shows a part of an internal combustion engine 1 with variable compression ratio. It comprises a connecting rod 2.

The connecting rod 2 is arranged in a connecting rod bearing 3 in a crank chamber 4 so that it can pivot around a crank pin (not shown). The crank chamber 4 is the cavity around the connecting rod 2 and around a crankshaft, which is bounded by a crankcase 1a, wherein the crankshaft is not shown and the crankcase is only schematically shown below (facing away from a piston which is not shown) the connecting rod 2. The connecting rod 2 has a piston pin bearing 5 next to the connecting rod bearing 3. With a piston pin, the connecting rod 2 is pivotably connected to a piston which is arranged in a cylinder so that it can be moved back and forth. A plane E passes through the axes of rotation of the cylindrical-jacket-shaped bearing 3, 5. A center plane δ is arranged normal on the rotational axes of bearings 3, 5. A longitudinal axis 2a of the connecting rod 2 is the intersection line of the middle plane δ and the plane ε.

The illustrated connecting rod 2 is divided into a connecting rod bearing bracket 6 and a connecting rod body 7 in the connecting rod bearing 3. The connecting rod body 7 faces the piston pin bearing 5 on the connecting rod 2 and the connecting rod bearing bracket 6 is arranged facing away from the piston pin bearing 5.

To achieve a variable compression ratio, a length adjusting device 8 is provided in the connecting rod 2. This length adjusting device 8 can be hydraulically or mechanically operable. The connecting rod 2 changes its length along its longitudinal axis 2a by means of the length adjusting device 8.

A switching unit 9 is arranged in the connecting rod body 7 to control the length adjusting device 8. The switching unit 9 is actuated by an actuating mechanism 10. Said mechanism is arranged in the area of the connecting rod bearing 3 and serves to transmit a switching pulse from the connecting rod bearing bracket 6 in the connecting rod body 7 to the switching unit 9. The switching unit 9 is arranged in the embodiments shown in each case in the connecting rod body 7, facing the piston pin bearing 5, in the vicinity of the connecting rod bearing 3.

The actuating mechanism 10 has a pick-up unit 20, a transmission means 30 and a deflection element 50. The deflection element 50 can be contacted with an actuating device 60. The actuating device 60 acts on a first force-application region 51 or on a second force-application region 52 of the deflection element 50.

In the figures the connecting rod 2 is in its lower dead center, which means that the piston assumes its smallest distance from the crankshaft.

Figure 3:
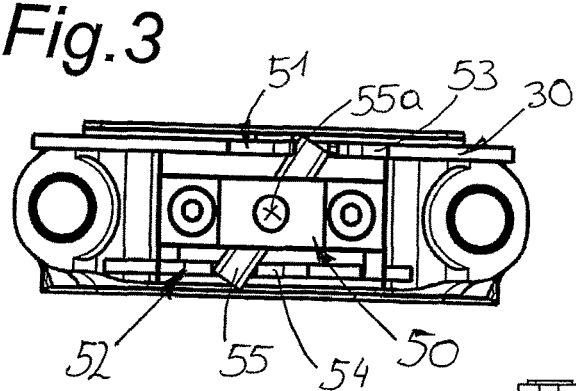
FIG. 3 shows this connecting rod in a view from below.

The deflection element 50, as shown in FIG. 3, has a first force-application region 51. This is located on a first driver 53, which is fork-shaped. The second force-application region 52 is located on the opposite side of the center plane δ on a second driver 54. The second driver 54 also has a fork shape. Between the fork arms of the drivers 53, 54 there is a deflection lever 55 which can be rotated about a pivot point 55a between a first lever position and a second lever position. The second driver 54 is displaceable.

Figure 4:
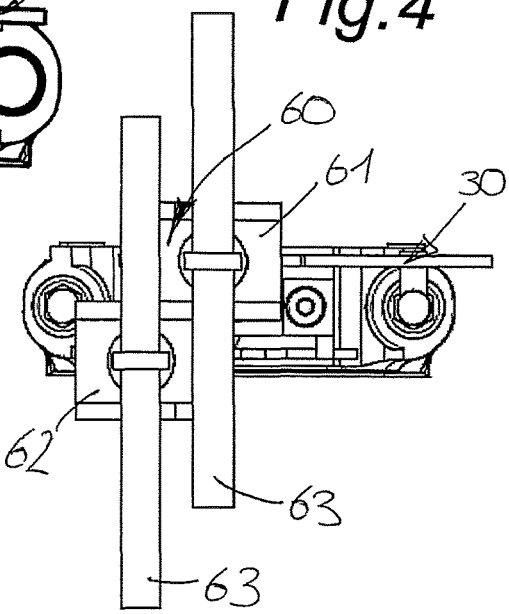
FIG. 4 shows this connecting rod with an actuating device in a view from below.

A first actuating element 61 can engage the first force-application region 51 and a second actuating element 62 can engage the second force-application region 52. The first actuating element 61 and the second actuating element 62 are part of the actuating device 60 shown in FIG. 4. The actuating elements 61, 62 can either be moved along a shaft 63 or rotated around the shaft 63 out of engagement. The actuating elements 61, 62 each have a curved sliding surface 61a, 62a for the respective driver 53, 54.

Figure 5:
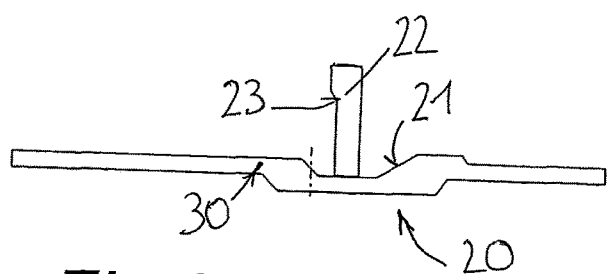
FIG. 5 shows a pick-up unit of this connecting rod in a first position in a plan view.
Figure 6:
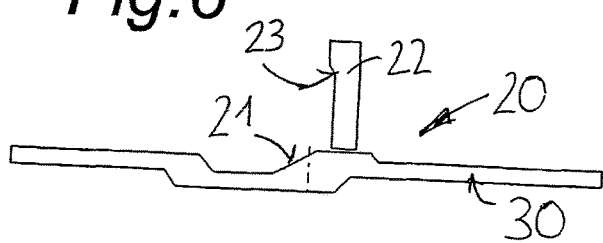
FIG. 6 shows this pick-up unit of the connecting rod in a second position in a plan view.

In the first embodiment, as shown in detail in FIG. 5 and FIG. 6, the pick-up unit 20 has a ramp 21 on the transmission means 30 and a thrust element 22. The thrust element 22 continues to act with a guide surface 23 on the switching unit 9.

Figure 7:
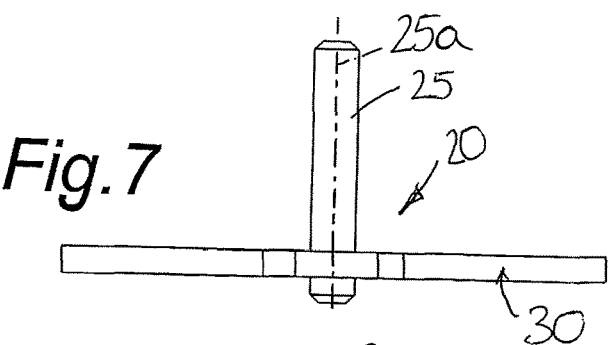
FIG. 7 shows a pick-up unit of a connecting rod of a reciprocating-piston engine according to the invention in an alternative embodiment in a plan view.
Figure 8:
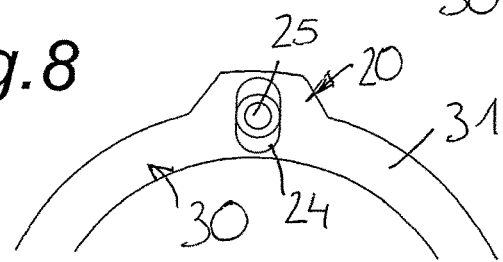
FIG. 8 shows this pick-up unit in a side view.

In an alternative embodiment of the pick-up unit 20, as shown in FIG. 7 and FIG. 8, said unit has an oblong hole 24 on the transmission means 30, in which a pin 25 can be displaced normally along its longitudinal axis, i.e. the pin axis 25a. The pin 25 is firmly connected to the switching unit 9 and moves it when the transmission means 30 moves. In FIG. 8, the transmission means 30 is designed as a ring slide 31.

In the figures FIG. 9, FIG. 10, FIG. 11 and FIG. 12 the actuating mechanism 10 is shown in detail. In this case, the ramp 21 of the pick-up unit 20 is arranged on the ring slide 31. The first driver 53 is arranged on the ring slide 31. The first driver 53 and the ring slide 31 are made in one piece. The driver 53 is located on the ring slide 31 opposite ramp 21, on the side facing away from the connecting rod body 7. A base body 56 of the deflection element 50 is firmly connected to the connecting rod 2. In the embodiment shown, the second driver 54 is arranged on this base body 56 so that it can be moved.

The actuating mechanism 10 has a detent element 70 and the ring slide 31 has two detent recesses 71, on which the detent element 70 acts with a force F against a displacement of the ring slide 31. The force F is generated by a compression spring 72 of the detent element 70 and acts on the ring slide 31 via a spherical detent body 73 in the embodiment shown. In the first embodiment, the switching unit 9 is designed as a switching valve 11 which releases or blocks hydraulic connections to the length adjusting device 8.

Figure 15:
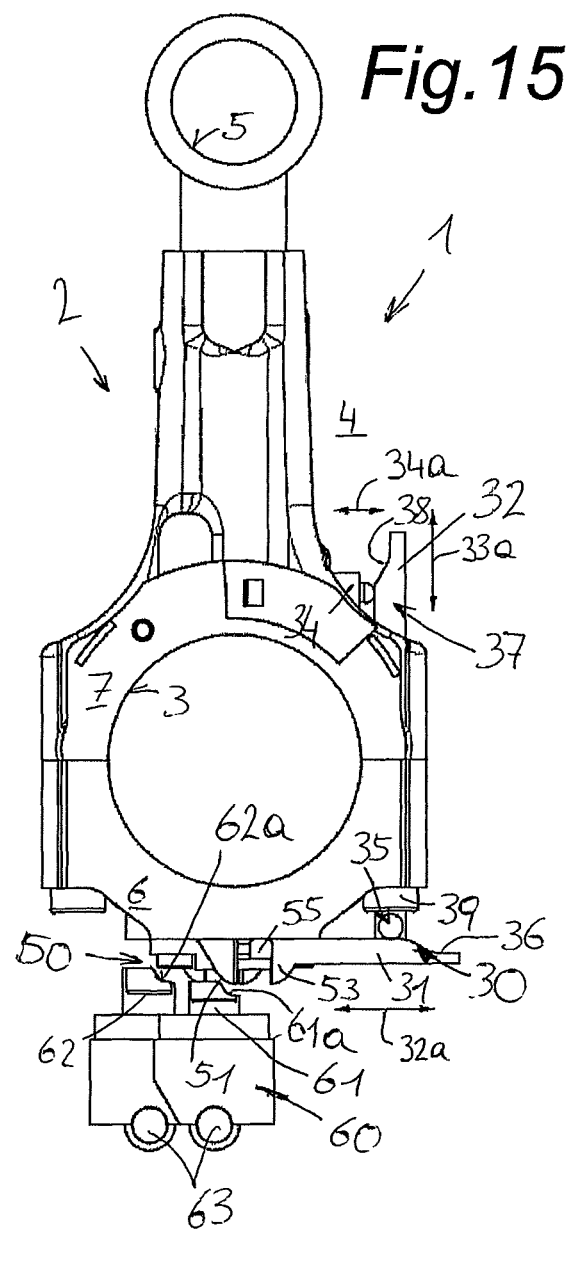
FIG. 15 shows this connecting rod in a side view.

In a second embodiment, as shown in FIG. 13 to FIG. 15, the transmission means 30 is not designed as a ring slide 31. The transmission means 30 here has a first push rod 32, a second push rod 33 and a third push rod 34. The first push rod 32 is displaceably mounted on the connecting rod bearing bracket 6. Its longitudinal axis here is arranged normal to plane ε. The first driver 53 is firmly connected to the first connecting rod 32.

The first push rod 32 can be moved along its longitudinal axis via the deflection element 50. The first push rod 32 acts on the second push rod 33. This second push rod 33 is arranged normally on the first push rod 32 and its longitudinal axis is parallel to the center plane δ, wherein this longitudinal axis in the embodiment shown even lies in the center plane δ.

The second push rod 33 engages with a first end 35 on a first rod guide surface 36 of the first push rod 32. This first rod guide surface 36 ensures an axial displacement of the second push rod 33 in the second displacement direction 33a during axial displacement in the first displacement direction 32a of the first push rod 32. The second push rod 33 in turn has a second rod guide surface 38 at a second end 37 facing the connecting rod body 7, which acts on the third push rod 34. By axially displacing the second push rod 33, the third push rod 34 is axially displaced by the second rod guide surface 38 in the third displacement direction 34a. The rod guide surfaces 36, 38 have an inclined surface section.

The third push rod 34 is permanently connected to the switching valve 11 in the embodiment shown.

Figure 16:
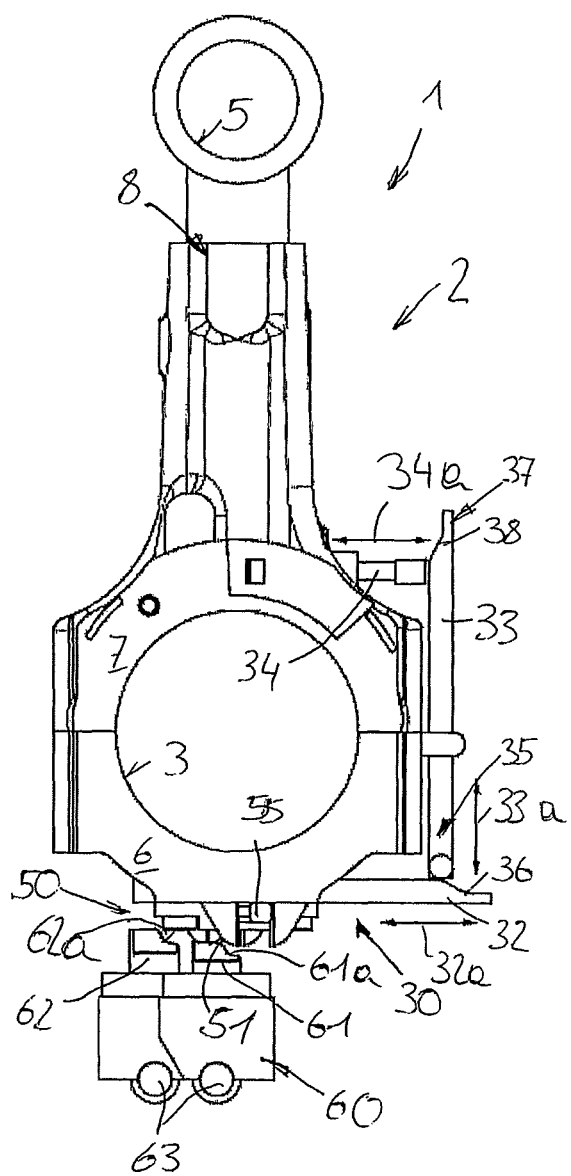
FIG. 16 shows a connecting rod of a reciprocating-piston engine according to the invention in a third embodiment in a side view.

In the second embodiment, the second push rod 33 is displaceably arranged in a hollow connecting rod bearing screw 39. In contrast to this, in a third embodiment, which is shown in FIG. 16, the second push rod 33 is mounted displaceably on the connecting rod bearing bracket 6 or on the connecting rod body 7 next to the connecting rod bearing screw 39.

Figure 17:
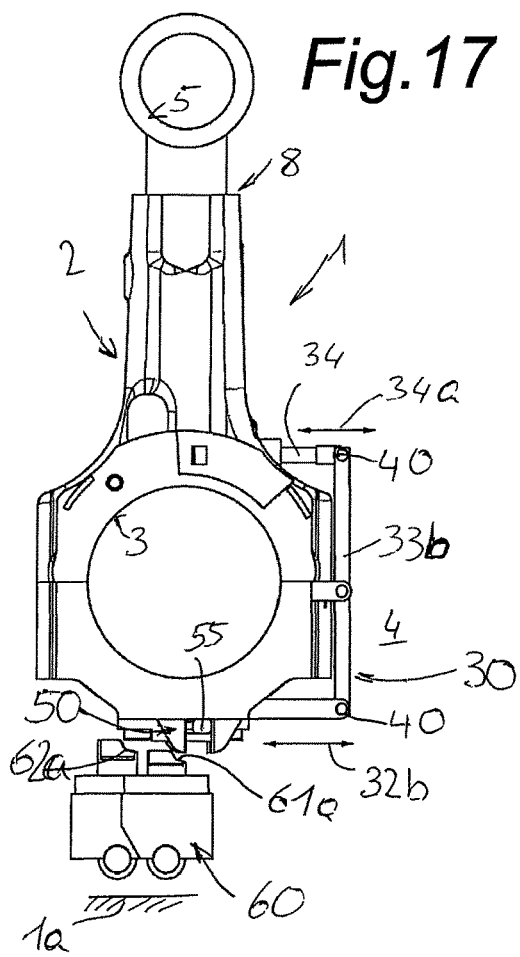
FIG. 17 shows a connecting rod of a reciprocating-piston engine according to the invention in a fourth embodiment in a side view.
Figure 18:
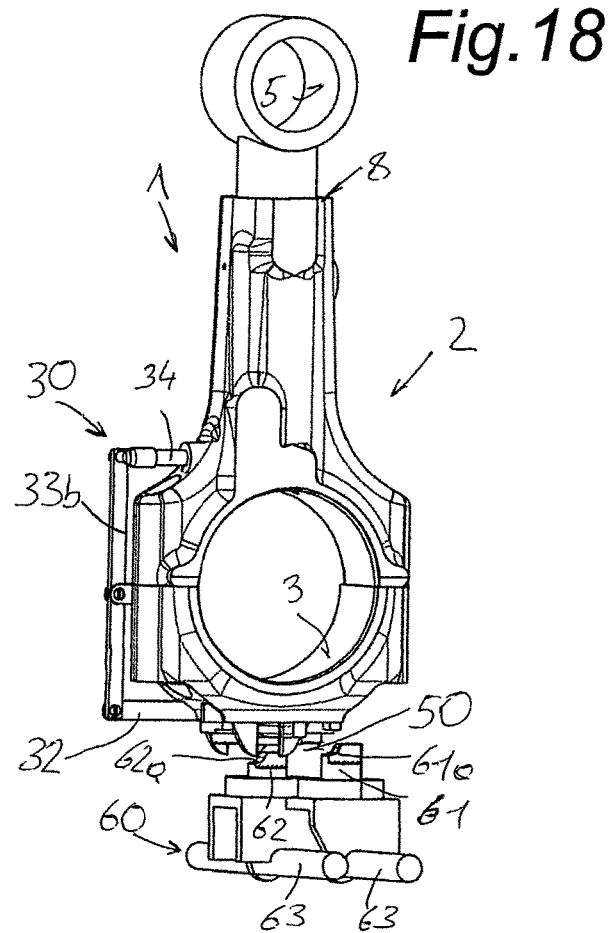
FIG. 18 shows this connecting rod in an oblique view.

In a fourth embodiment (FIG. 17, FIG. 18), instead of a second push rod 33, a tilt rod 33b similar to the third embodiment is rotatably mounted on the connecting rod bearing bracket 6 or on the connecting rod body 7. Instead of the first rod guide surface 36 and the second rod guide surface 38, the first push rod 32 and the third push rod 34 are connected to joints 40.

The figures FIG. 19, FIG. 20 and FIG. 21 show a fifth embodiment of the reciprocating-piston engine. In this case, the switching unit 9 is designed as a wedge element 12. The wedge element 12 is moved by the pick-up unit 20 between two wedge positions 13. In one of the wedge positions 13, two threaded spindles 14, which have the length adjusting device 8, are each locked in one direction of rotation and, in another wedge position 13, the threaded spindles 14 can turn against each other.

The first embodiment describes the mode of operation in more detail: To change the length of the connecting rod 2 in the direction of the longitudinal axis 2a, either the first actuating element 61 or the second actuating element 62 is brought into contact with the respective driver 53, 54.

In this case, for example, the first actuating element 61 is moved or twisted into the engaged position as shown in the figures, while the connecting rod 2 is moved with the crankshaft. In the area of the lower dead center, the first driver 53 comes into contact with the sliding surface 61a of the first actuating element 61. The pivoting movement of the connecting rod 2 shifts the first driver 53, the deflection lever 55 is pivoted into the first lever position shown in FIG. 3. With the first driver 53, the ring slide 31 is rotated around the connecting rod bearing 3, wherein the force F acts on the transmission means 30, the ring slide 31, against the rotation of the detent element 70. This force F is large enough to prevent twisting which does not result from the action of the actuating element 60.

Figure 9:
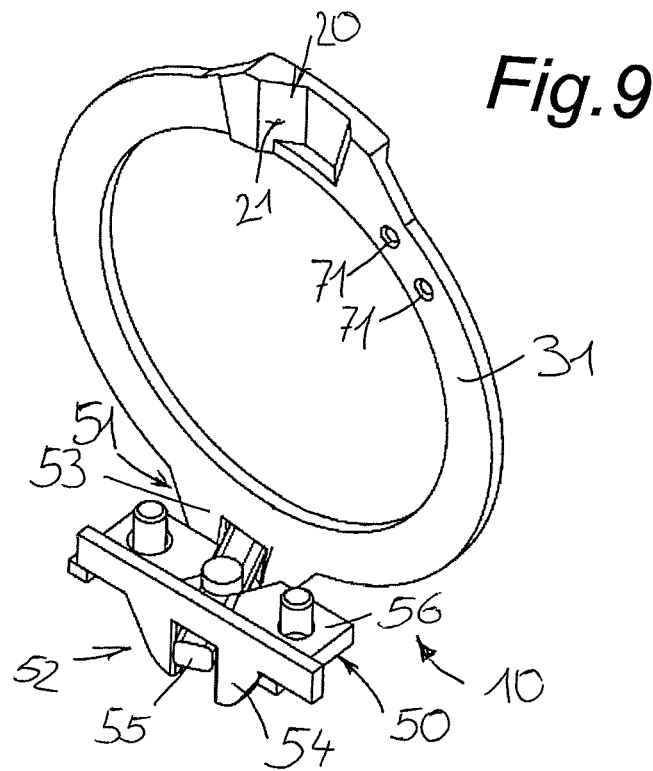
FIG. 9 shows an actuating mechanism of the connecting rod in the first embodiment in an oblique view.
Figure 10:
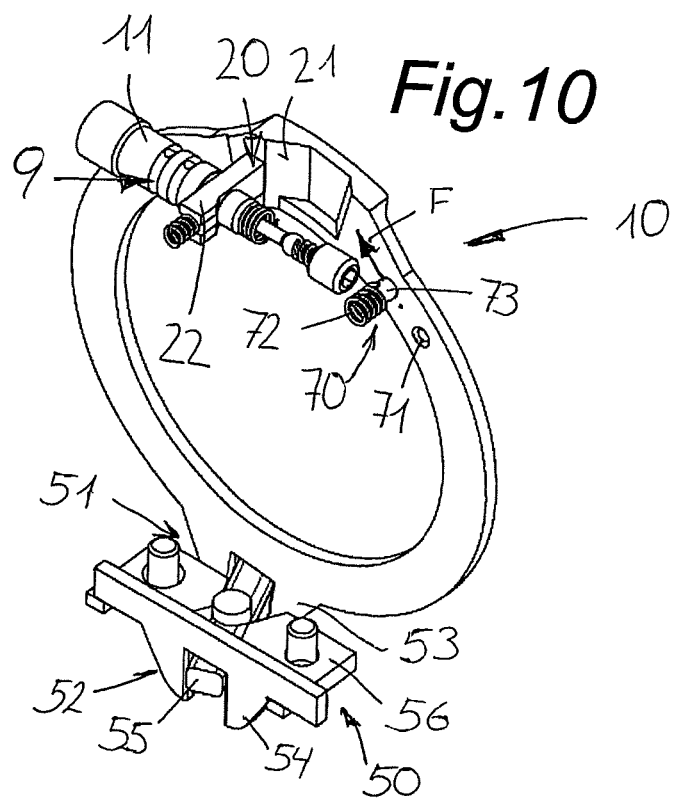
FIG. 10 shows the actuating mechanism with a switching unit of this connecting rod in an oblique view.

By turning the ring slide 31, the thrust element 22 is pushed away from the ramp 21 of the pick-up unit 20 by the ring slide 31 in its axial direction (longitudinal axis of thrust element 22) into a second position (FIG. 6). The switching valve 11 is also displaced by the guide surface 23 on the thrust element 22 (FIG. 9).

By moving the first driver 53 and the further pivoting movement of the connecting rod 2, the first driver 53 moves over the sliding surface 61a.

Similarly, the second driver 54 engages with the second sliding surface 62a. The deflection lever 55 is shifted in this case to the second lever position and the deflection lever 55 is used to shift or twist the first driver 53 and then to twist the ring slide 31. The thrust element 22 is shifted along its longitudinal axis over the ramp 21 closer to the ring slide 31 into a first position (FIG. 5) and the guide surface 23 ensures a shift of the switching valve 11.

Analogous to the operation of the first embodiment, the pin 25 of the alternative embodiment of the pick-up unit 20, see FIG. 7 and FIG. 8, is displaced when the ring slide 31 is rotated with it. The oblong hole 24 ensures that the pin 25 only performs a translatory movement when the ring slide 31 is rotated and that the movement has no rotational components, so that the pin 25 and the switching valve 11 can also be firmly connected.

In the second embodiment, the third embodiment and the fourth embodiment the rods 32, 33, 33b, 34 assume the function of the ring slide 31.

In the fifth embodiment, the wedge element 12 is moved by the ring slide 31 instead of the switching valve 11 in the first embodiment. In this case, the wedge element 12 is arranged directly on ramp 21. A separate thrust element 22 is not necessary, as the wedge element 12 performs this task of the pick-up unit 20 itself. In an embodiment not shown, an additional thrust element 22 may be provided.

The invention claimed is:

1. An internal combustion engine, with a variable compression ratio, comprising:
    a connecting rod including a connecting rod bearing;
    a length adjusting device within the connecting rod;
    a switching unit, within the connecting rod, configured to activate the length adjusting device;
    an actuating mechanism operatively connected to the switching unit in the region of the connecting rod bearing, the actuating mechanism configured to introduce a switching pulse into the connecting rod, the actuating mechanism including
        a deflection element with at least one first force-application region and at least one second force-application region, the first force-application region and the second force-application region configured to selectively contact at least one actuating device;
    wherein the actuating mechanism further includes a transmission means operatively connected to the deflection element and arranged in proximity to the connecting rod bearing; and
    wherein the transmission means includes, on a side of the connecting rod facing the piston pin bearing, a pick-up unit configured to actuate the switching unit for the length adjusting device.

2. The internal combustion engine of claim 1, wherein the deflection element has a deflection lever.

3. The internal combustion engine of claim 1, wherein the deflection element is arranged on a connecting rod bearing bracket.

4. The internal combustion engine of claim 3, wherein the transmission means is a ring slide configured to transmit the switching pulse from the connecting rod bearing bracket to a connecting rod body.

5. The internal combustion engine of claim 3, wherein the deflection element is configured to be contacted by the actuating device in the vicinity of a lower dead center of the connecting rod.

6. The internal combustion engine of claim 1, wherein the actuating device is arranged in a crankcase.

7. The internal combustion engine of claim 1, wherein the pick-up unit includes a ramp and a thrust element configured to be displaced by the ramp.

8. The internal combustion engine of claim 1, wherein the pick-up unit further includes an elongated hole configured to receive a pin which is displaceably arranged normal to a longitudinal axis of the pin.

9. The internal combustion engine of claim 1, wherein the deflection element includes at least one first driver connected to the transmission means.

10. The internal combustion engine of claim 9, wherein the deflection element further includes at least one second driver.

11. The internal combustion engine of claim 9, wherein the at least one first driver is fork-shaped.

12. The internal combustion engine of claim 1, wherein the transmission means includes at least a first push rod, a second push rod and a third push rod, wherein the first push rod is operatively connected to the second push rods and the second push rod is operatively connected to the third push rod.

13. The internal combustion engine of claim 1, wherein the transmission means includes at least a first push rod, a tilt rod and a third push rod, and the first push rod is operatively connected to the tilt rod and said tilt rod is operatively connected to the third push rod.

14. The internal combustion engine of claim 1, wherein the switching unit is a switching valve.

15. The internal combustion engine claim 1, wherein the switching unit is a displaceable wedge element.

16. The internal combustion engine of claim 1, wherein the actuating device includes a first actuating element and a second actuating element, wherein the first force-application region is configured to selectively contact the first actuating element and the second force-application region is configured to selectively contact the second actuating element.

17. The internal combustion engine of claim 16, wherein the first actuating element and the second actuating element each have a sliding surface configured to contact the first force-application region and the second force-application region.

18. The internal combustion engine of claim 1, wherein the actuating mechanism includes a latching element configured to resist a displacement inducing force on the transmission means.

\* \* \* \* \*